United States Patent [19]

Johannsen

[11] Patent Number: 4,926,571
[45] Date of Patent: May 22, 1990

[54] CONNECTION FOR CONNECTING COMPRESSED-AIR LINES

[75] Inventor: Karl Johannsen, Lübeck-Travemünde, Fed. Rep. of Germany

[73] Assignee: O&K Orenstein & Koppel Aktiengesellschaft, Berlin, Fed. Rep. of Germany

[21] Appl. No.: 186,148

[22] Filed: Apr. 26, 1988

[30] Foreign Application Priority Data

Apr. 29, 1987 [DE] Fed. Rep. of Germany ....... 3714220

[51] Int. Cl.[5] ............................................. E02F 3/88
[52] U.S. Cl. ........................................... 37/72; 37/58; 37/DIG. 1; 285/137.1
[58] Field of Search ................ 37/58, 72, DIG. 1; 285/131, 132, 332, 334.4, 137.1

[56] References Cited

U.S. PATENT DOCUMENTS

| 3,512,281 | 5/1970 | Hadjidakis | 37/72 X |
| 4,083,135 | 4/1978 | de Koning et al. | 285/137.1 X |
| 4,242,815 | 1/1981 | Ver Meulen | 37/72 X |
| 4,351,122 | 9/1982 | Cornelis et al. | 37/58 |
| 4,506,706 | 3/1985 | Sandmann | 138/93 |
| 4,536,017 | 8/1985 | Weirich et al. | 285/137.1 X |

Primary Examiner—Dennis L. Taylor
Assistant Examiner—Arlen L. Olsen
Attorney, Agent, or Firm—Toren, McGeady & Associates

[57] ABSTRACT

A connection for connecting compressed-air lines arranged on the body of a floating dredge leading to measuring devices, control devices or the like, with measuring air lines mounted on a suction pipe of the floating dredge used for suction pipe position measuring units for the operation of pneumatic drives of throttle valves or the like arranged on the suction pipe. The measuring air lines are connected to a coupling component which is fastened on the sliding plate of the suction pipe elbow. A coupling countercomponent is fastened to the body of the dredge in the region of the sliding plate. The compressed-air lines lead from the coupling countercomponent to the devices arranged on the body of the dredge.

8 Claims, 5 Drawing Sheets

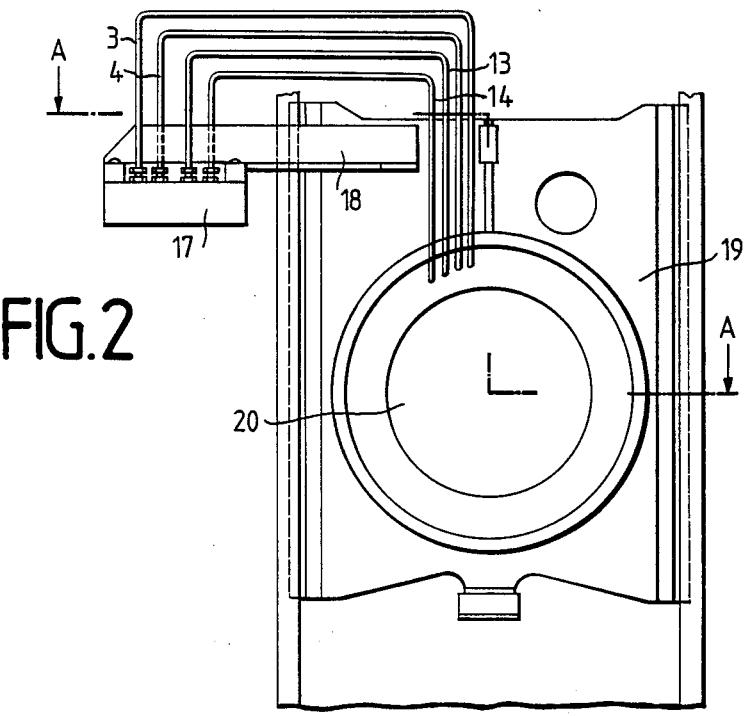
FIG.2
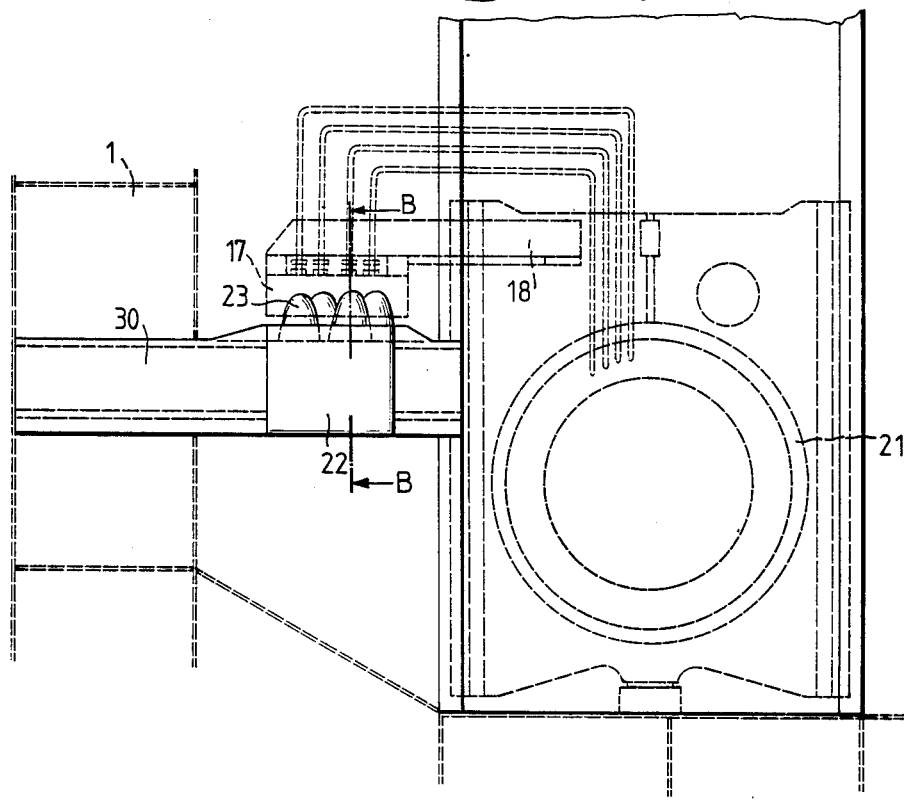

CONNECTION FOR CONNECTING COMPRESSED-AIR LINES

BACKGROUND OF THE INVENTION

1. Field of the Invention

The present invention relates to a connection for connecting compressed-air lines arranged on the body of a floating dredge with compressed-air lines mounted on the suction pipe of the floating dredge which are used for suction pipe position measuring units for the operation of pneumatic drives of throttle valves or the like arranged on the suction pipe. The compressed-air lines arranged on the body of the floating dredge lead to measuring devices, control devices or the like.

2. Description of the Prior Art

Pneumatic measuring units for the suction pipe position and the dredging depth are known. These units are provided with air feeding devices which conduct measuring air to several locations on the suction pipes. For this purpose, several measuring lines are placed on the suction pipe, wherein the measuring lines end at different locations of the suction pipe.

By means of the above-described units, the static pressures at the ends of the compressed-air measuring lines are measured and transmitted to a suction pipe position indicator. The measuring unit can be provided with several measuring systems, for example, three measuring systems. Under the influence of the measured pressures, the position of the suction pipe under water is indicated in the suction pipe position indicator with the aid of a suction pipe model, so that the respective position of the suction pipe underwater can be recognized immediately. The suction pipe position indicator may be arranged in the control room or another location of the floating dredge. In the known arrangements, the measuring lines fastened to the suction pipe are connected to the air feeding device through elastic hoses, wherein the transfer of the hoses in the region of the slide plate from the floating dredge to the vertically movable suction pipe is effected by means of hose winches, hose drums or the like which serve for rolling the hoses on or off.

It is also known in the art to provide in the suction pipe a throttle valve which is equipped with a pneumatic drive. This pneumatic drive is controlled through a pressure line which, in the same manner as described above, is connected to a compressed air control device through elastic hoses. These hoses are again guided on hose winches of the above-described type. The throttle valve makes it possible to prevent surrounding water from entering when the suction head is clogged, so that interruptions and problems in the conveying units are avoided.

The hose winches, hose drums or the winding devices for hoses are to be mounted at suitable locations of the dredge's or ship's body. A disadvantage is the susceptibility to trouble of the freely suspended hoses which extend outboard from the deck through the water to the suction pipe. Trouble occurring in the hose guidance will result in down-times of the dredge.

It is, therefore, the primary object of the present invention to provide a connection for compressed-air lines or the like which are arranged on the body of a floating dredge and lead to measuring devices, control devices and the like, wherein the connection is not susceptible to trouble due to the freely suspended hoses and which is safe to operate.

SUMMARY OF THE INVENTION

In accordance with the present invention, the measuring air lines mounted on the suction pipe are connected to a coupling component which is fastened on the sliding plate of the suction pipe elbow. A coupling counter component is fastened to the ship's body in the region of the sliding plate. Additional compressed-air lines lead from the coupling counter component to devices, such as, air feeding devices, control devices or the like, which are arranged on board of the ship's body.

By means of the air coupling according to the present invention, a connection between the lines fastened on the suction pipe and lines leading to the air feeding device and the control device arranged on board of the ship is effected when the suction pipe is in operating position.

In accordance with an embodiment of the present invention, the sliding plate is provided with a support for fastening a coupling component which is movable in the moving direction of the sliding plate. A coupling counter component is fastened on the ship's body in the region of the sliding plate when the latter is in the operating position, so that the two coupling components are coupled to each other when the suction pipe is in operating position.

Accordingly, the coupling is automatically effected when the sliding plate carrying the suction pipe elbow is adjusted into the operating position. The air coupling is closed when the suction pipe with its sliding plate is in the operating position. On the other hand, a discharge of air is prevented when the air coupling is opened, i.e., when the pipe elbow is pulled out of the operating position.

The connection according to the present invention has the advantage that hose winches, hose drums to be arranged on the ship and especially freely suspended hoses guided through the water are avoided. As a result, the dangers which exist during the operation of a dredge due to these freely suspended components, for example, the danger of tearing off of the freely suspended hoses due to floating ice, currents or drifting materials, are prevented.

Another advantage is that the air lines are substantially shorter. Thus, in accordance with the present invention, it is not necessary to provide components for suspending or mounting the freely suspended hoses, hose winches, hose drums or the like.

The air coupling according to the present invention cannot only be used for connecting the measuring line for the suction pipe position measuring units or the pressure lines for actuating the throttle valve, but also for other air lines which are used in the operation of a suction pipe, for example, for the pneumatic drive of cutting rollers or the like which are mounted at the suction head or at a different location of the suction pipe.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawings:

FIG. 2 is a side view of the guidance of the sliding plate for the suction pipe elbow, a coupling component being fastened to the sliding plate by means of a support;

DETAILED DESCRIPTION OF THE INVENTION

Figure 1:
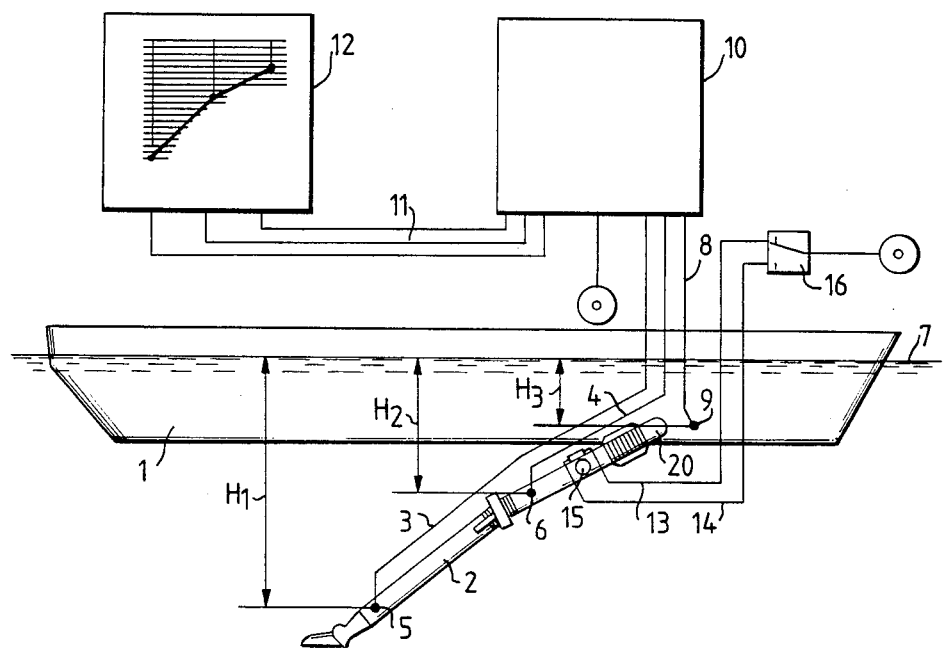
FIG. 1 is a schematic elevational view of a floating barge with lowered suction pipe including an arrangement according to the present invention.
Figure 3:
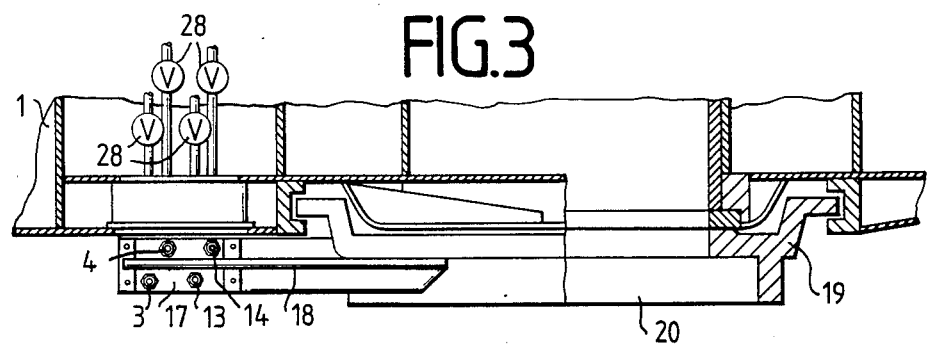
FIG. 3 is a sectional view, on a larger scale, taken along sectional line A—A of FIG. 2.

A ship's body 1 of a floating dredge has on one of its sides a suction pipe 2 which is illustrated in FIG. 1 in the lowered operating position. Several measuring air lines 3 and 4 are fixedly mounted on the suction pipe 2. The lines 3 and 4 end freely in the water at 5 and 6, i.e., the actual measuring locations. These measuring locations are located on levels H1 and H2, respectively, underneath the water line 7.

A third measuring air line 8 is provided. This line 8 ends at a measuring location 9 which is arranged fixedly on the ship's body 1. Measuring location 9 is located at level H3 below water line 7.

As shown in FIG. 1, measuring air lines 3, 4 and 8 lead to an air feeding device 10 which is arranged on the ship's body 1 and which, in turn, is connected through lines 11 with a suction pipe model 12. This suction pipe model 12 represents the position of the suction pipe 2 under water.

Two additional compressed air lines 13 and 14 are fastened to the upper portion of suction pipe 2. Compressed air lines 13 and 14 lead to the drive of throttle valves 15 and to a control device 16 arranged on the ship.

As shown in FIG. 2, the air lines 3, 4, 13, 14 lead to the coupling component 17 which is connected through a support 18 to a sliding plate 19.

Figure 4:
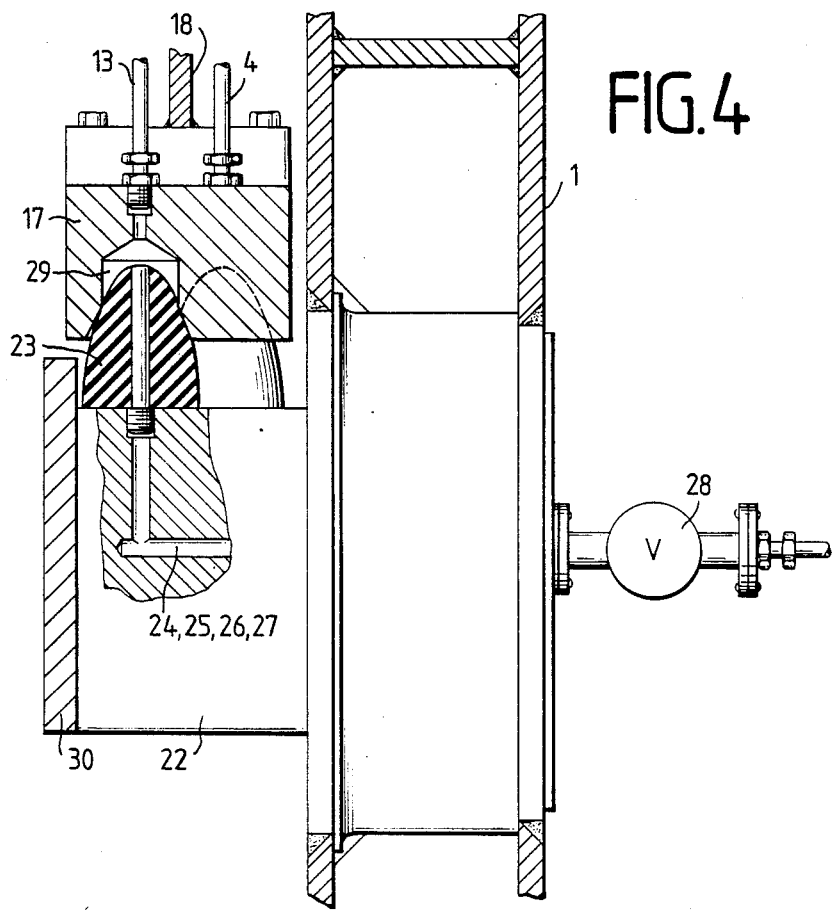
FIG. 4 is a sectional view, on a larger scale, taken along sectional line A—A of FIG. 2.

When the sliding plate 19 is moved downwardly from the top into the operating position 21 as illustrated in FIG. 2, coupling component 17 reaches a coupling position with coupling counter component 22. This coupling position is illustrated in FIG. 4 on a larger scale. Coupling component 17 is illustrated in FIG. 2 in dotted lines in the coupled operating position.

The coupling counter component 22 has plug-type, elastic parts 23 which extend into sleeve-type counter parts 29 at the coupling components 17. Bores are provided in the plug-type parts 23. Air lines 24, 25, 26, 27 end in these bores. The lines 24, 25, 26, 27 are fixedly placed on the ship's body 1 and two of the lines lead to the measuring device 10 and two of the lines lead to control device 16.

A shutoff valve 28 is provided in each of the lines 24–27.

In the illustrated embodiment, the plug-type parts 23 are conical and engage in correspondingly shaped counter parts 29 of the coupling component 17. Other types of coupling connections can be used instead of the described type of connection.

The air lines and the couplings are constructed for the desired control pressures or measurement pressures. These pressures range approximately between 1–10 bar. Of course, the coupling components can also be constructed for other pressures.

The coupling counter component 22 is fastened to the ship's body 1 through a flange 30.

Figure 5:
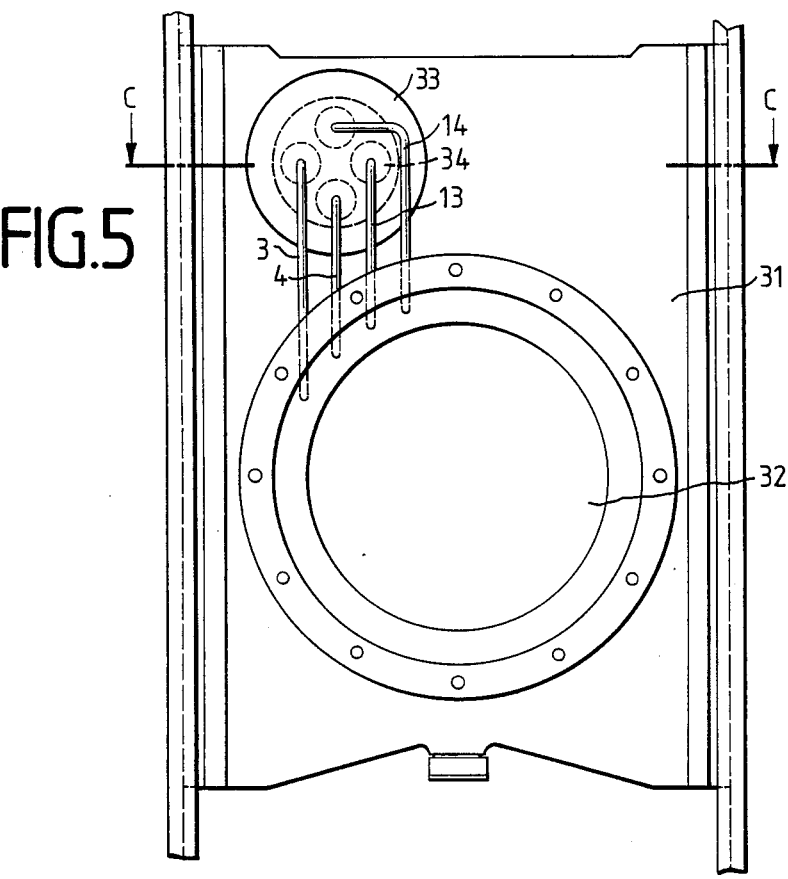
FIG. 5 is a side view, similar to FIG. 1 but on a larger scale, of another embodiment of the present invention.
Figure 6:
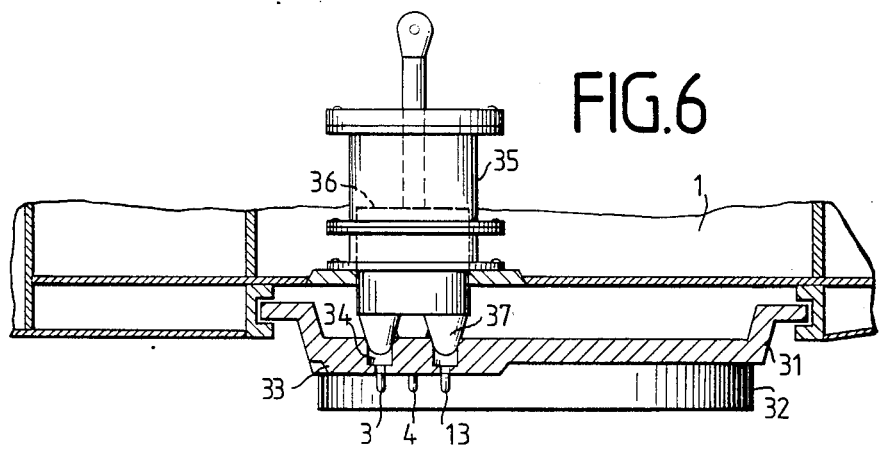
FIG. 6 is a sectional view taken along sectional line C—C of FIG. 5.
Figure 7:
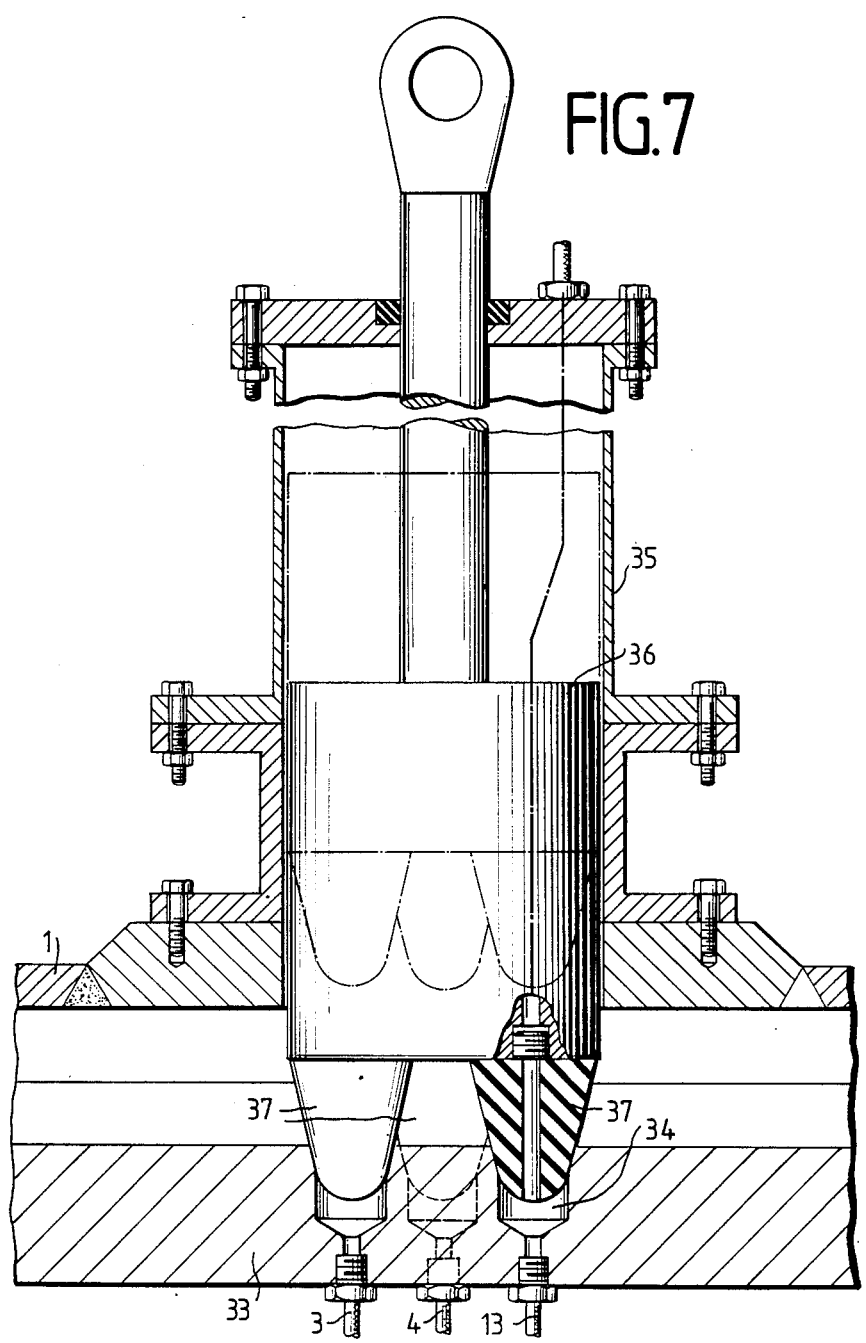
FIG. 7 is an illustration of the air coupling of FIG. 6 on a larger scale.

The coupling illustrated in FIGS. 5–7 differs from the above-described coupling essentially in that the coupling components operate in horizontal direction. For this purpose, a coupling 33 is arranged on the sliding plate 31 of the suction pipe elbow 32. Coupling piece 33 is provided with sleeve-type or conically-shaped coupling openings 34 to which are connected the ends of the air lines 3, 4, 13, 14 mounted on the suction pipe 2.

A horizontally extending coupling counter component 35 is fastened to ship's body 1. Coupling counter component 35 includes a horizontally slidable part 36 which at its front side is provided with four plug-type parts 37 which may be of the same type as the plug-type parts 23.

In the illustration in dotted lines in FIG. 5, plug-type parts 37 are shown in the retracted position, so that the sliding plate 31 can be moved away from the operating position. The plug-type parts 37 also have bores and are connected to air lines 3, 4, 3, 14 which correspond to the air lines 24–27 of the embodiment described above. Air lines 3, 4, 13, 14 are also fixedly mounted on the ship's body 1 and lead to the air feeding device 10 and the control device 16, respectively.

While specific embodiments of the invention have been shown and described in detail to illustrate the application of the inventive principles, it will be understood that the invention may be embodied otherwise without departing from such principles.

I claim:

1. In a connection for connecting compressed-air lines arranged on the body of a floating dredge, the compressed-air lines leading to measuring devices, control devices or the like mounted on the floating dredge, with compressed-air lines mounted on a suction pipe of the floating dredge used for suction pipe position measuring units for the operation of pneumatic drives of throttle valves or the like arranged on the suction pipe, the suction pipe including a suction pipe elbow with a sliding plate, the improvement comprising the compressed-air lines mounted on the suction pipe being connected to a coupling component mounted on the sliding plate, a coupling countercomponent being fastened to the body of the dredge near the sliding plate, the compressed-air lines leading from the coupling countercomponent to the measuring devices, control devices or the like.

2. The connection according to claim 1, wherein the sliding plate includes a support for fastening the coupling component, the coupling component being movable in the moving direction of the sliding plate, the coupling countercomponent fastened to the body of the dredge in the region of the sliding plate when the latter is in the operating position, so that the coupling component and the coupling countercomponent are coupled to each other when the suction pipe is in operating position.

3. The connection according to claim 1, comprising means for moving the coupling countercomponent and means for inserting the coupling countercomponent in the coupling component when the sliding plate is in the operating position.

4. The connection according to claim 1, wherein the coupling component and the coupling countercomponent form a plug-type coupling, the plug-type coupling including plug-type connecting members, the connecting members defining passage means for conducting air therethrough.

5. The connection according to claim 4, wherein the plug-type connecting members are of an elastic material.

6. The connection according to claim 5, wherein the coupling countercomponent with the plug-type connecting members is movably fastened through a support to the sliding plate, the coupling countercomponent being fastened on the body of the dredge in the region of the sliding plate in the operating position, so that the coupling component and the countercomponent are coupled to each other in the operating position of the suction pipe.

7. The connection according to claim 1, wherein the compressed-air lines include shutoff valves.

8. The connection according to claim 7, comprising means for automatically opening and closing the shutoff valves when the coupling component and the coupling countercomponent are coupled or uncoupled.

* * * * *